(12) United States Patent
Pescatore et al.

(10) Patent No.: US 7,409,078 B2
(45) Date of Patent: Aug. 5, 2008

(54) METHOD FOR REGISTRATION OF AN IMAGE APPLIED TO DIGITAL SUBTRACTED ANGIOGRAPHY

(75) Inventors: Jeremie Pescatore, Paris (FR); Francois Peter, Guyancourt (FR); Morgane Bourdon, Quimper (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 813 days.

(21) Appl. No.: 10/985,803

(22) Filed: Nov. 10, 2004

(65) Prior Publication Data

US 2005/0111719 A1    May 26, 2005

(30) Foreign Application Priority Data

Nov. 21, 2003   (FR)   .................................... 03 50882

(51) Int. Cl.
*G06K 9/00* (2006.01)
*G06K 9/32* (2006.01)

(52) U.S. Cl. ..................................................... 382/130

(58) Field of Classification Search ......... 382/128–132, 382/154, 293–294; 378/4, 8, 21–27, 195–209, 378/20, 98–98.12
See application file for complete search history.

(56) References Cited

U.S. PATENT DOCUMENTS 5,633,951 A    5/1997   Moshfeghi 6,196,715 B1 *  3/2001   Nambu et al. ................ 378/197
6,834,994 B2 * 12/2004   Ozawa et al. ............... 378/196

OTHER PUBLICATIONS

Hanaizuma et al. "An Automatic Registration Method for Remotely Sensed Multispectral Images by Using Spatial Correlation Between Local Triangles", Remote Sensing: Economic Tool for the Nineties, Proc. International Geoscience and Remote Sensing Symposium (IGARSS), IEEE vol. 3 Symp. 12, Jul. 10, 1989, pp. 1287-1290.

Meijering et al. "Image Registration for Digital Subtraction Angiography", International Journal of Computer Vision, vol. 31, No. 2/3, Apr. 1999, pp. 227-246.

(Continued)

*Primary Examiner*—Sherali Ishrat
(74) *Attorney, Agent, or Firm*—Cantor Colburn LLP (57) ABSTRACT

In registration of images in digitized subtracted angiography, X-rays irradiate a patient's body. A first digitized mask image is acquired without an injection of the contrast agent into the body, then the contrast agent is injected into the body, and a second digitized contrast image is acquired. The mask image is divided with regular geometrical patterns and a registration is made of the mask image relative to the contrast image through the use of landmarks defined at the corners of the geometrical patterns. These two images are subtracted after registration, and the subtracted image is displayed. The robustness of the landmarks is furthermore tested, and if the robustness is insufficient, a subdivision is made of the regular geometrical patterns.

20 Claims, 3 Drawing Sheets

OTHER PUBLICATIONS

Bentoutou et al., "An Invariant Approach for Image Registration in Digital Subtracted Angiography", Pattern Recognition, Pergamon Press, vol. 35, No. 12, Dec. 2002, pp. 2835-2865.

Maintz et al., "A Survey of Medical Image Registration", Medical Image Analysis, Oxford Univ. Press, vol. 2, No. 1, 1998, pp. 1-37.

Meijering, "Image Enhancement in Digital X-Ray Angiography", Image Sciences Institute, Utrecht, NL, 2000, chap. 2.

Buzug et al., "Weighted least squares for point-baed registration in DSA", SPIE Conf. on Image Proc., Feb. 1999, SPIE v. 3661, pp. 139-150.

Pescatore et al., "Tetrahedral 3D Finite element meshes of head Tissues from MRI for the MEG/EEG forward problem", SCIA'01 conf. Bergen, No. 2 June 2001, pp. 17-24.

* cited by examiner

METHOD FOR REGISTRATION OF AN IMAGE APPLIED TO DIGITAL SUBTRACTED ANGIOGRAPHY

REFERENCE TO RELATED APPLICATIONS

This application claims the benefit of a priority under 35 USC 119(a)-(d) to French Patent Application No. 03 50882 filed Nov. 21, 2003, the entire contents of which are hereby incorporated by reference.

BACKGROUND OF THE INVENTION

An embodiment of the invention relates to a method for the registration or resetting of an image applied to digital subtracted angiography. The applicable field of the invention is that of medical imaging.

Angiography is the term applied to techniques used for the acquisition of images of blood vessels in an object or body, typically a patient's body. During the acquisition, the blood is opacified by means of a contrast agent making the vascular system visible in the direction of applied radiation, typically X-rays. Radiography is used for the acquisition of the angiography sequences. X-rays are sent out at a given rate and the images are digitized and then stored on a storage disk.

X-ray angiography is currently the reference examination in therapeutic vascular neuro-radiology. To be able to make a diagnosis, a physician must be able to extract information on the patient's vascular system from photographs of the patient. However, the blood vessels and blood have an absorption index that is substantially the same as that of the surrounding tissues.

Digital Subtracted Angiography (DSA) is a technique that substantially overcomes this limitation. The operational mode for DSA is as follows. A contrast agent, typically an iodide-based contrast agent, is injected into the patient's blood vessel. This agent is highly radio-opaque and enables a reading of the contrast in the vascular tissues. The angiography examination is based on the acquisition of two sequences. A first sequence is made without any contrast agent; it is known as a mask image sequence. A second sequence following the first sequence is made after the injection of the contrast agent; it is known as a sequence of opacified images or contrast images. These two sequences therefore ideally differ only by the presence of opacified blood vessels. A subtraction between these images then reveals the payload information.

However, owing to the patient's movements, both externally (the non-immobility of the patient, respiration, swallowing motions, etc.) and internally (cardiac motion, heart pulse, intestinal gases, etc.), the subtracted angiography images have artifacts that adversely affect the quality of the medical diagnosis. To eliminate these artifacts entirely, it is necessary to devise an automatic, robust and precise technique to correct the patient's movements. In this method, before subtraction, the mask image is registered relative to the opacified image by the application of local geometrical deformations to it. In one local example, these deformations are determined by the maximizing of a criterion of similarity.

With a rigid registration module, for each image that the user wishes to register, the user chooses a rectangular zone that will serve as an ROI (Region of Interest). A shift vector is then computed between the mask image and the corresponding contrast image on the basis of the chosen zone. The computation method is explained further below. This single vector is used to register the entire image.

Since the registration is rigid it therefore generally enables efficient registration only in the selected region. Indeed, the patient's movement is rarely uniform: two structures near the heart and the lungs may be located in a same image and will be respectively be influenced to a greater degree by the heartbeat and respiration. Furthermore, since the acquisitions are 2D projections of 3D structures, the motions of a near structure may be different from those of a distant structure. Nor can the rotational motions of the body be taken into account. This often results in the creation of troublesome artifacts outside the region of interest. The practitioner can therefore focus on only one small zone at a time. Furthermore, if the size of the region of interest is too great, artifacts may be created within this very zone, because the surface is then too great for a measurement of similarity to be significant. These deteriorations in image quality are not acceptable.

Another limitation is the obligation for the user to choose the region of interest, and the time that this operation takes. Indeed, for a many patients, a large number of images and the choice of several zones per image, this action of choosing the ROI becomes considerable.

Finally, if the measurement of similarity is unstable, the registration is not done. This situation can arise if the user has selected a homogeneous zone, where computation is impossible. This safety wall is a good thing in itself because it prevents the application of a wrong shift to the entire image but does not make possible to register all the zones desired. In this case, there is a further loss of time.

In view of these limitations, another solution was found to the problem of registration. This solution had to give a subtracted image of higher quality. Non-rigid or elastic registration algorithms were then proposed. The basic principle of these non-rigid algorithms is the search, relative to each pixel of the image, for an associated shift vector, for example by maximizing a criterion of similarity for each pixel. The computation of the shifts for each pixel by criterion of similarity is however very costly in computation time. Meijering et al., in "Image Enhancement in Digital X-Ray Angiography", Image Sciences Institute, Utrecht, Netherlands, chap. 2, 2000, has furthermore shown that another technique, known as the optical flow technique, is not applicable in the case of digital subtracted angiography.

To reduce computation time, a reduced set of control points, or landmarks, is then selected and a shift vector is then estimated for these control points. These shifts are then propagated to all the pixels of the image by interpolation. The computation time is then reduced.

The choice of the landmarks is then preferably done on the mask image in order to prevent a situation where one of them does not belong to the vascular system, and is thus properly revealed only in the contrast image and therefore does not appear in the mask image. The landmarks may be chosen in two ways: either by means of a regular spatial distribution (a grid), or by a definition according to their characteristics (uneven distribution).

The first method does not take account of the particular features of the image. The homogeneous zones of the image therein possess landmarks, whereas for them the shift vector is impossible to estimate while the highly non-homogeneous zones do not have enough landmarks therein to make a precise assessment of the shift vector.

The second method enables this problem to be resolved through an adequate and robust distribution of the landmarks. As a criterion of robustness, it is possible to choose a criterion of the gradient. Indeed, it can be seen that the subtraction artifacts appear in digital subtracted angiography in zones that are dense in structures.

For the computation of the shift vector, each landmark has an associated region of interest on which the computation of similarity will be done. It has been shown that the best results, taking account of the computation time as well as the visual quality, were obtained for a region of interest sized 48×48 pixels.

However, certain problems of registration remain. X-ray imaging comprises projections of a 3D image on a 2D image. This may prompt the appearance, between two acquisitions, of structures that have been concealed beforehand. Another problem is that of isophotes, namely lines of equal light intensity, such as those corresponding to the edge of a bone. The shifting of a pixel of this line is indeterminate if this motion is parallel to the isophote. Indeed, the question is how to determine the new position of a point among neighbors having the same intensity.

Another major problem persists with the method in which the choice of landmarks is made as a function of their characteristics. This problem is that of the determining of the landmarks concerned for the computation of interpolation of the shift of a pixel. In practice, for a pixel for which the shift has to be computed, it is necessary to determine all three landmarks forming the smallest possible triangle around this pixel. This determining process is very lengthy because, in principle, it is possible to envisage many candidate landmarks. For example if, by chance, four candidate landmarks are distributed at the four corners of a square, there are four triangles, hence four possible ways, of determining pixel shift vectors within the square.

BRIEF DESCRIPTON OF THE INVENTION

An embodiment of the invention is a method for the registration of images in digitized subtracted angiography comprising: irradiating a body with radiation; acquiring a first digitized mask image without an injection of the contrast agent into the body; injecting the contrast agent into the body; acquiring a second digitized contrast image; dividing the mask image with regular geometrical patterns; registering the mask image relative to the contrast image through the use of landmarks defined at the corners of the geometrical patterns; subtracting these two images after registration; displaying the subtracted image; testing the robustness of the landmarks; and if the robustness is insufficient, a subdivision is made of the regular geometrical patterns.

BRIEF DESCRIPTION OF THE DRAWINGS

An embodiment of the invention will be understood more clearly from the following description and the accompanying figures. These figures are given purely by way of an indication and in no way restrict the scope of the invention. Of these figures.

DETAILED DESCRIPTION OF THE INVENTION

Figure 1:
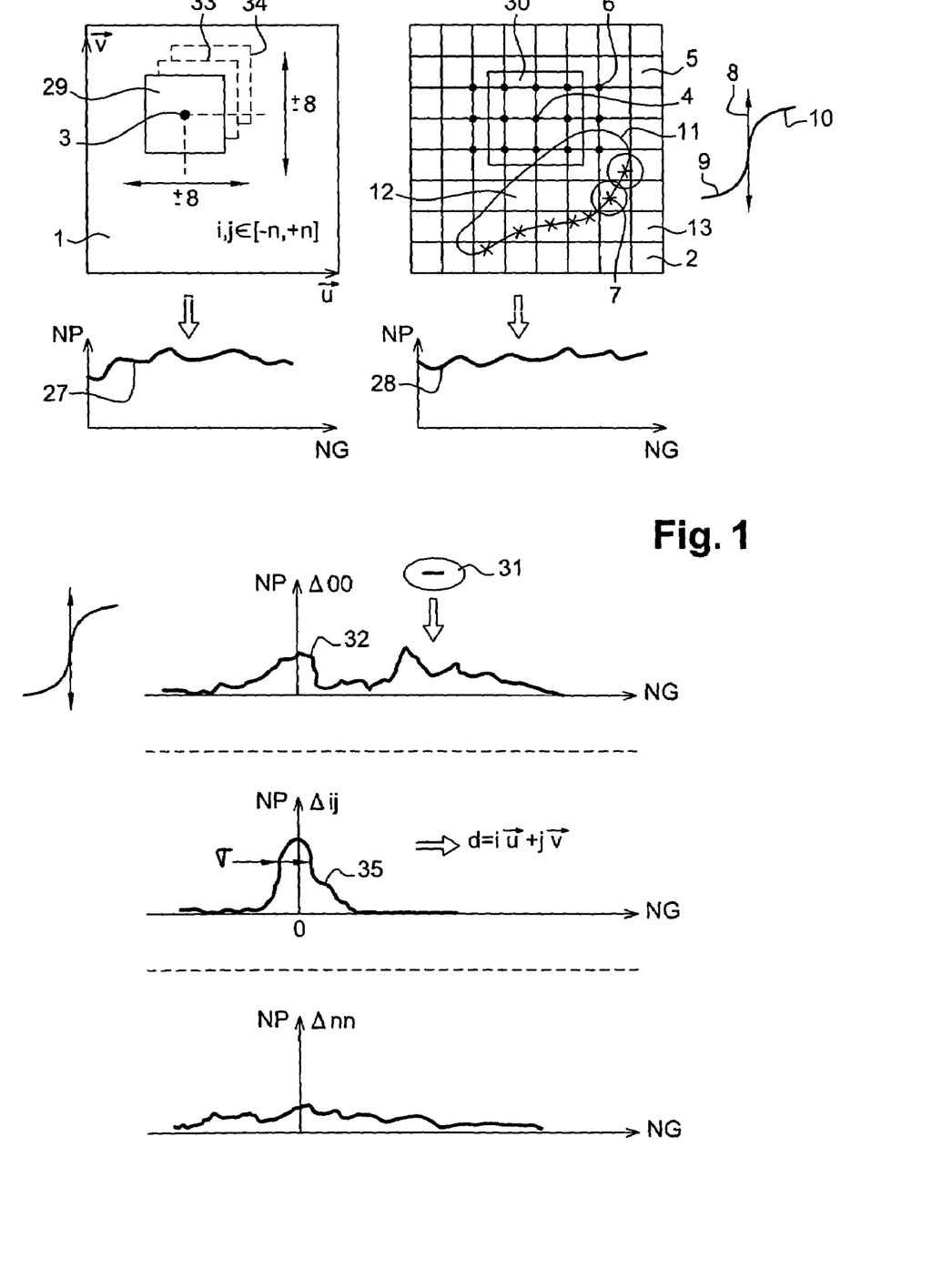
FIG. 1 is a schematic view of the context of implementation of an embodiment of the method.

FIG. 1 is a schematic a view of the context and main preliminary steps of an embodiment of the method of the invention. In particular, during a subtracted radiology experiment, a patient's body, not shown, has been irradiated by radiation to give rise to the acquisition of a first mask image 1, without any injection of a contrast agent. Then a contrast image 2 has been acquired. For this acquisition, the patient's body has been injected with a contrast agent. Since the images 1 and 2 are not acquired at the same time the patient's movements result in a situation where there is no exact correspondence between a particular pixel 3 of the image 1 and a theoretically corresponding pixel 4 of the image 2.

FIG. 1 also shows particular features of computation of the shift undergone by the pixel 3 relative to its corresponding pixel 4 in the image 2. These particular features shall be described in detail further below.

In the prior art, one of the two images, especially the mask image 1, is divided with regular geometrical patterns. Here, for reasons of drawing convenience, the subdivision has been shown on the contrast image, but it corresponds rather to the subdivision of the mask image. The geometrical pattern shown in the image 2 is a conventional pattern formed by squares such as 5, whose distribution is such that the intersections 6 of these squares are sufficient in number to give a population of adequate landmarks.

As a complement to an embodiment of the invention, FIG. 1 shows that the landmarks could be made differently. Indeed, by taking a gradient image from the mask image 1, the contrast image 2, or from an image subtracted from either of these two images, it is possible, at each pixel such as 7, to reveal a piece of information relative to the slope 8 of the variation of a gray level in the pixel 7 between what happens on one side 9 of this pixel and another side 10 of this pixel. Represented schematically, the contrast image enables the definition of a contour 11 demarcating a zone 12 where a gray level is low, for example equal to the level 9, and a zone 13 external to the contour 11 in which the gray level is higher, for example equal to the level 10.

The advantage of determining the contours 11 leads to the determination of landmarks such as 7 whose position can be measured more precisely in order to result in a more exact registration of the images. Furthermore, the landmarks such as 7 have the advantage of corresponding to zones in which the blood vessels will have to be revealed, and this is a favorable point. The drawback of this method is that, for the subsequent correction by interpolation of all the points of the subtracted image that are not landmarks, the problem is to know which are the neighboring landmarks likely to contribute to the computation of the shift by interpolation.

Figure 2:
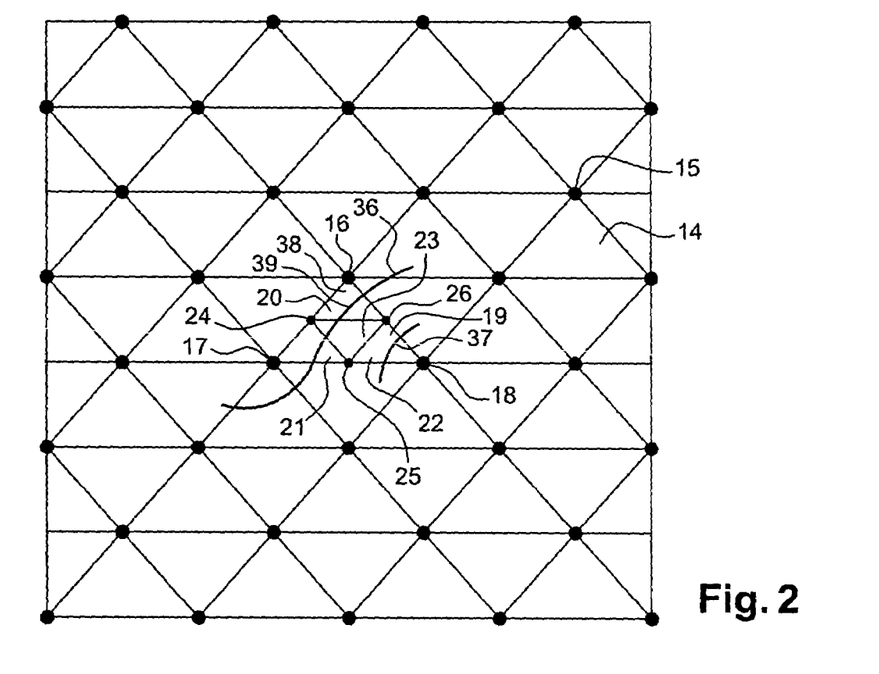
FIG. 2 is a schematic view of the main steps of an embodiment of the method.
Figure 3A:
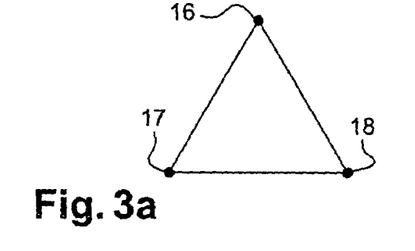
FIGS. 3a to 3d show particular features of the geometrical pattern of an embodiment of the invention.

In an embodiment of the invention, referring to FIG. 2, a regular pattern has also been chosen. In the example, the regular pattern is a pattern formed by equilateral triangles such as 14, distributed throughout an image. The number of these equilateral angles furthermore leads to a regular number of positions of candidate landmarks such as the landmark 15. These landmarks such as 15 are effectively placed at the corners of the geometrical patterns 14. In an embodiment of the invention, tests will furthermore be conducted on the robustness of each of the landmarks, for example the landmarks 16, 17, 18 and if this robustness is insufficient, a triangle 19 corresponding to these landmarks 16 to 18 will be subdivided into four sub-patterns, four sub-triangles 20 to 23. This subdivision leads to the determination of intermediate landmarks 24 to 26. These intermediate landmarks will contribute to a better image registration at the position of the triangle 19. If the robustness of the landmarks 16, 17 and 18 is sufficient or rather if the robustness of the intermediate landmarks 24 to 26 is deemed to be lower, no subdivision is brought about (FIG. 3a).

Figure 3B:
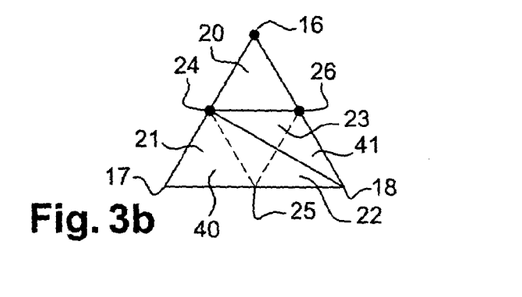
Figure 3C:
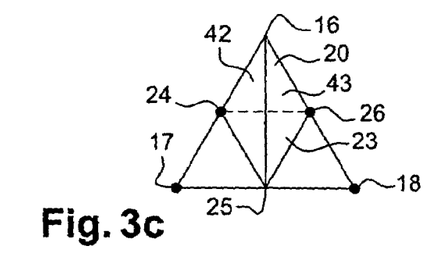
Figure 3D:
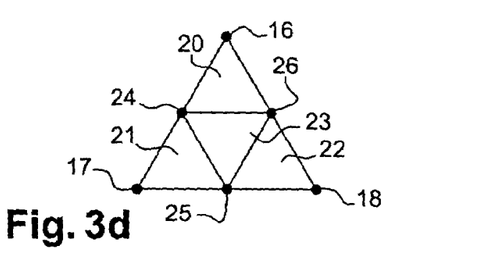

Each landmark 16, 17 or 18 is tested according to a method of homogeneity that will be seen further below to find out its robustness. Several solutions for a triangle 19 may be encountered. The first possibility is that only one landmark (see FIG. 3b), i.e., the landmark 16, is considered to be insufficiently robust. In this case, it will lead to the determining, that corresponds to the sub-pattern 20, of two intermediate landmarks 24 and 26. If two landmarks 17 and 18, or three landmarks 16, 17, 18, respectively FIG. 3c and FIG. 3d, are insufficient, they lead to the determination of the other intermediate landmarks 24, 25 and 26. The difference between the subdivision chosen in FIG. 3b and the one chosen in FIG. 3c or FIG. 3d will be explained further below.

For the computation of the shift vector at the position of the chosen landmarks, the main landmarks 16 to 18 or the intermediate landmarks 24 to 26, different procedures are possible. In particular, an embodiment of the invention uses a method of similarity shown schematically in FIG. 1. For each of the images, namely the mask image 1 and the contrast image 2, histograms 27 and 28 respectively are computed. On the x-axis, these histograms 27 and 28 show the gray levels NG while on the y-axis they show the numbers of pixels NP in which these gray levels are encountered. These numbers of pixels correspond to numbers of pixels in an environment 29 of a landmark 3 for which it is sought to obtain the similitude of the histogram with the histogram of the pixels located in an environment 30 centered on a corresponding landmark 4. These two histograms 27 and 28 are subtracted from one another in an operation 31 that leads to a subtraction histogram 32 with a characteristic $\Delta 00$. This characteristic corresponds to the first assumption according to which the two images were acquired when the patient had not being moving.

To enable the computation of the histograms in the different triangles, it is necessary to know the pixels located within them. To this end, the Bresenham algorithm is used. It enables a choice of pixels, in the trace of lines that ensures the continuity of the segment, the greatest possible straightness as well as low computation time. By applying this algorithm to all three edges of the triangles, it is possible, for each line, to know the first and last pixel belonging to the triangle.

In practice, pixel 3, and hence its environment 29 is made to shift in order to carry out the exploration, by successive environments 33, 34, of all the possible positions of the environment 29. For each of these positions, the histogram is subtracted from the one corresponding to the position of the environment 30. Histograms of mask images and contrast images as well as subtracted images denoted $\Delta ij$ are therefore set up for each of these other positions 33, 34 and so on and so forth, i and j being coefficients relating to the shifting of the environments 33 and 34 along the Cartesian coordinates u and v of the image 1. For each of these shifts, a measurement is made at each time on this histogram $\Delta ij$ of the number of pixels corresponding to the gray levels 0 as well as the mean standard deviation $\sigma$ of this histogram.

When both images are perfectly registered, and discounting the presence of the contrast agent, the values of all the pixels of the registered environments 30 and 29, or 30 and 33 or 30 and 34 correspond to a point such that the difference signal measurable at the position of each pixel of the subtracted image is zero. In theory, for appropriate registration a Dirac signal ought to be obtained at the position of the gray level 0. In fact, the right histogram of results is taken to be the one for which either the number of pixels at the gray level 0 is the maximum or the one for which the mean standard deviation a is the lowest.

The environment 29, as well as the environment 30 and the others, preferably has a width of 48 pixels by 48 pixels.

The explorations of the assumed shift of the environments 29 to 33, or 34, are equivalent to plus or minus 8 pixels on the x-axis and plus or minus 8 pixels on the y-axis. In this case, rather than trying the 256 possible positions, an embodiment of the invention proceeds by dichotomy. In particular, a search is made to find out whether the shift of plus or minus 8 in one direction or another produces better results than the histogram $\Delta 00$. If it is better, it is chosen. Then, relative to the position of this best histogram, a shift of plus or minus 4 is made in the reverse direction on the x-axis and/or on the y-axis. The comparison is made once again and, starting from the point obtained, a shift equal to plus or minus 2 is made along each of the two axes u and v. Around the best histogram, finally, a shift of plus or minus 1 is made. In practice, instead of computing 256 histograms, it is shown that it is easy to limit the computation to 33 histograms to find the most appropriate histogram $\Delta ij$.

As a variant, for the computation of the best histogram, it is possible to limit the computation to an environment of 3×3 pixels. For the computation of the shift, a bigger environment may be preferred, especially one related to the size of the pattern or sub-pattern concerned. The values i and jb give the value of the shift vector d of the shift of the landmark 3 according to the vector equation $d=ixu+jxv$.

To find out whether or not a search must be made for intermediate landmarks 23 to 26, a homogeneity search is made. In particular, the gradient image is made from the rough subtraction image (without registration). If it were displayed, this subtraction image would reveal contours such as 36 and 37 (FIG. 2). These contours 36 and 37, or more precisely these structural variations, make it possible, each time, to determine two types of pixels in each of the sub-patterns 20 to 22. Pixels of a first type such as the pixel 38 are located in the sub-pattern 20 but not on the contour 36. Pixels 39 of a second type are located in the sub-pattern 20 on the contour 36. Then, for the whole set of the pixels of the sub-pattern 20, the average of the gray levels of the gradient image of the (rough) subtracted image is computed. Very broadly, the explanation can be simplified by stating that the pixels 38 for which the value of the difference in terms of subtraction is equal to 0 will not contribute to the average. Only the pixels 39 will contribute to it.

This average is computed firstly on the sub-pattern 20, and secondly on the initial pattern 19. For the initial pattern it will be noted that the average is taken for all the pixels and divided by four in keeping with the comparison. Indeed, there are four sub-patterns in the pattern 19. The two average values are then compared. There are two possible situations. The first possibility is that a contour 36 is present and, on the whole, the sub-pattern 20 is less homogenous than the pattern 19. If this is the case, it is considered that structures are present in the pattern 20 and therefore lead to an indication that the landmark 16 is active, i.e. that it is a good landmark capable of giving rise to the intermediate landmark 24 and the intermediate landmark 26 (FIG. 3b). The same procedure is performed for the sub-pattern 21 and the sub-pattern 22 in order to determine whether all the landmarks 24, 25 and 26 have to be considered as being active.

In the examples shown in FIGS. 3b and 3c, a differentiation will be made for the subdivision that is different from the differentiation it has in FIG. 3d (for which a total subdivision is made). Indeed, in FIG. 3b, the tests on landmarks 17 and 18 have not led to choosing the landmark 25 as a useful intermediate landmark. For the landmark 25, therefore, no computation of shift will be undertaken and the points located in the sub-pattern 23 will not be registered in using the position of this landmark 25 that is not chosen. Indeed, given the robustness thus measured, it is deemed that the landmarks 17 and 18 are better.

In this case, as shown in FIG. 3b, the three sub-patterns 21, 22, and 23 are decomposed into two particular triangular sub-patterns. The first particular sub-pattern is the triangle 40 whose vertices are the two landmarks 17 and 18 and the intermediate landmark 24. The other particular sub-pattern is the triangle 41, whose vertices are the landmark 18 and the sub-landmarks 24 and 26. Acting in this way ensures that the points located in these triangles 40 and 41 will be registered with landmarks whose shifts will have been measured more precisely than in the case of the landmark 25.

With regard to FIG. 3b, a choice has been made of the triangles 40 and 41 in arbitrarily making a diagonal pass from the landmark 18 to the landmark 24. However, a similar distribution could have been obtained by making a diagonal pass from the landmark 17 to the landmark 26.

In FIG. 3c, the two sub-patterns 20 and 23 are replaced by two other triangles 42 and 43, respectively having vertices that are the landmarks 16, 24 and 25, and 16, 26 and 25. The approach is the same as in the case of FIG. 3b.

By modifying the shape of the sub-pattern is this way, it is ensured that at no time is the triangulation non-compliant. Compliance here is defined as the fact that, for all the triangles of the final network, the intersections between two triangles are either a vertex, or a totally common edge, or an empty set. An edge is defined as a segment joining two landmarks, a main landmark and/or an intermediate landmark. A vertex is defined as a landmark or an intermediate landmark.

Naturally, the subdivision has been presented here once. However it is possible to envisage making the subdivision several times, especially in the case of FIG. 3d where three intermediate landmarks have been chosen. It is then possible to envisage the further subdivision of each of the triangles 20 to 23.

Figure 4:
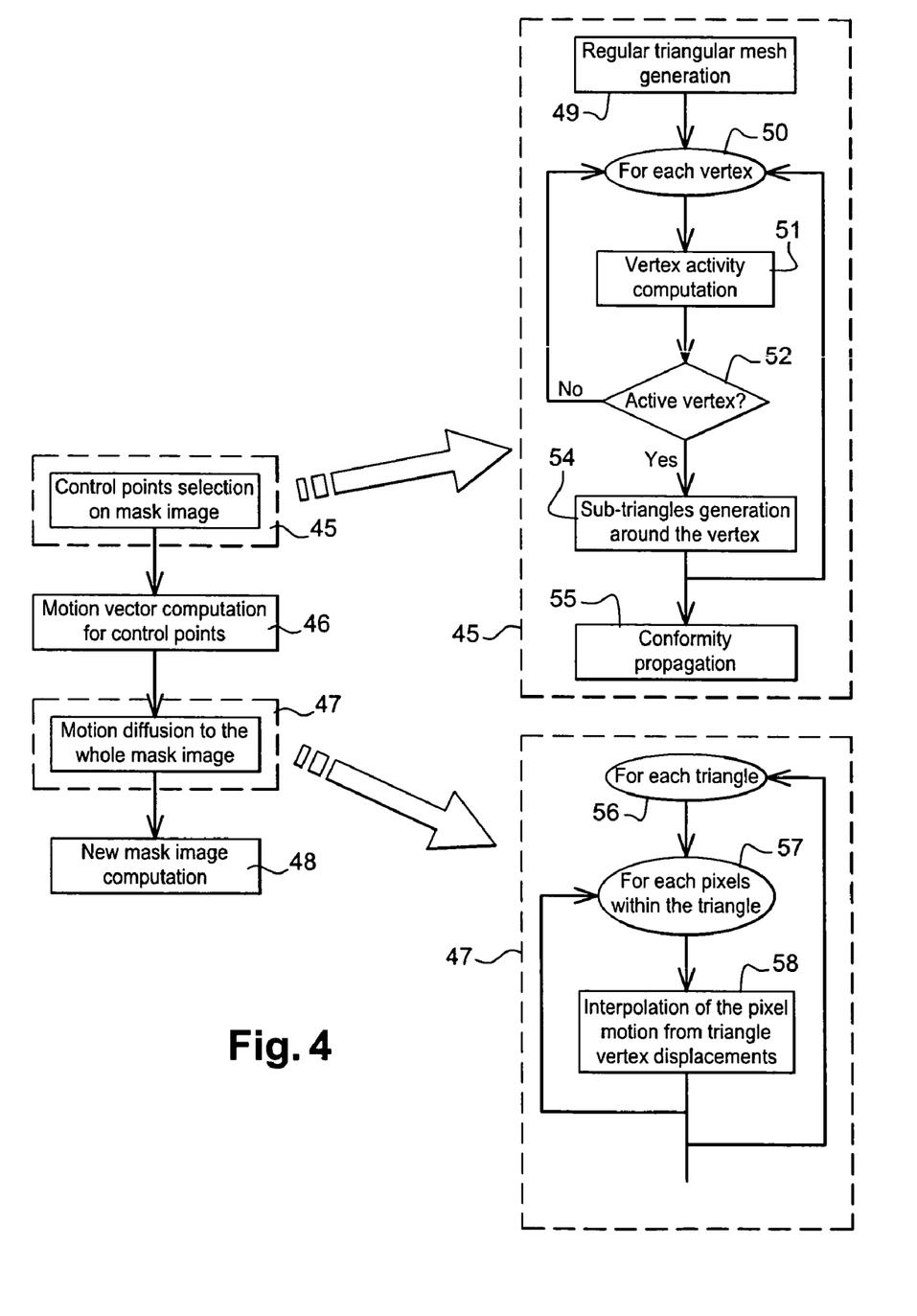
FIG. 4 is a view that synthesizes steps of an embodiment of the method.

FIG. 4 shows the main steps of an embodiment of the method. In step 45, the landmarks are selected as a function of what has been stated further above. In a following step 46, the shifts are measured, especially by the method of similarity shown with reference to FIG. 1. During a following step 47, the shifts are interpolated for all the pixels of the subtracted image, and during a final operation 48, the corrected subtracted image is produced, in taking account of the shifts measured at the step 47. The steps 46 to 48 are of a known type.

Step 45 comprises a first step 49 for the making of the regular mesh that, in this case, is preferably a regular mesh of triangles. Then each vertex, each candidate landmark 16 to 18, is selected during a step 50. During a following step 51, the activity of this vertex is computed. During a following step 52, the activity of this vertex, corresponding to the sub-pattern 20, is compared with the activity of the parent pattern that contains it. If a pattern is deemed to be active because the sub-pattern is less homogeneous, a generating of sub-patterns is effected around the landmark 16 by a step 54.

As shown in FIG. 4, this generating of sub-patterns can be perpetual. In one way on another, it is stopped, for example, when the size of a sub-pattern is smaller than a given size. Then, during step 55 subsequent to the generating of all the sub-patterns, the propagation of compliance is carried out. In practice, the patterns are made according to the FIGS. 3a, 3b, 3c or 3d depending on the number of landmarks and sub-landmarks that form it.

Step 47 comprises a selection 56 of each triangle. Step 47 also comprises a selection 57 of each pixel in this triangle. For each pixel, an operation 58 of interpolation is used to compare the shift vector applicable to the pixels. This computation is made from the shift vectors of the three vertices of the triangles that the pixel belongs. A great advantage is noted relative to the previous solution in the sense that there is no difficulty in making a selection, for a triangle, of the pixels concerned by this triangle. Indeed, for a given y-axis value v and depending on the boundaries u of the original x axis value and the end x-axis value of the edges of the triangle, the regular reading of the image memory naturally leads to determining the pixels concerned. Consequently, the step for determining the triangles concerned, as proposed by the determining methods derived from the preparation of the contours of FIG. 1, is eliminated and naturally increases the speed of an embodiment of the method of the invention.

As disclosed with respect to an embodiment of the invention, an embodiment of the invention uses two methods at a time. Firstly, it uses a regular, preferably triangular mesh. Hence the position of the candidate landmarks is known and, for a given pixel, the landmarks that concern this pixel may be perfectly known. The last problem here above pertaining to the determining process therefore disappears. Secondly, among these candidate landmarks, a test will be made of those landmarks that are the right candidates (those with which a reliable shift vector can be known for each point). If need be, a sub-meshing is undertaken to choose even more robust landmarks. It will be shown that, by this procedure, firstly the computation of the registration is faster and, secondly, it is more precise. In practice, a prior art correction takes about ten seconds whereas, in an embodiment of the invention, the correction is limited to one second and is of better quality.

Thus, an embodiment of the invention chooses a mesh that uses a regular geometrical pattern and, more particularly, a triangulation. The final choice however is that of a semi-regular grid. There is another known method, called the Delaunay triangulation method, used to obtain a triangular mesh. In an embodiment of the invention, a first regular triangular mesh is made, and then the triangles are divided according to a criterion based on their homogeneity. At this point, the Delaunay triangulation is abandoned for several reasons. Such a division sometimes forms elongated triangles that not appropriate for the interpolation of the shifts. In addition, the complexity of this type of algorithm makes its execution relatively lengthy, especially for the identifying of the three landmarks closest to a pixel to be corrected.

The following are the different steps of the chosen triangulation. A first step comprises defining a parent pattern, preferably an equilateral triangle, encompassing the image. It is chosen to encompass the image and not just a disk of a collimator because other modalities, mammography for example, do not produce the same type of image and have no disk.

This parent triangle is then sub-divided into four sub-patterns, in this case four equilateral child triangles, using the midpoints of each edge. This subdivision is arbitrarily repeated so long as the desired resolution on the size of the triangles is not achieved. In one example, the operation is stopped when the number of triangles is in the range of 150, giving about 150 candidate landmarks. The candidate landmarks are the vertices of the parent and child triangles. The choice of a triangle as a pattern is dictated by the simplification of the subsequent interpolation computation. However, other regular patterns, regular polygons (squares) or semi-regular polygons (rectangles) can be envisaged.

Then, among the candidate landmarks, those that are sufficiently robust are chosen to carry out efficient registration. To this end, an average value is computed for the gray levels of the pixels of each parent triangle in a gradient image of the mask image. In fact, the operation is based on the following principle: each triangle must demarcate a zone that is as homogeneous is possible. The idea would be that a different gray level should characterize each triangle. Thus, given the fact that the shift is computed on the vertices of the triangle (and therefore the boundaries of the homogeneous region), the registration takes account of the dynamic range of the image to the best possible extent. In practice, it is sought to approach this ideal case to the closest possible extent by using the smallest possible triangles. A gradient image is an image in which the features of interest are the contours of the structures, in this case the contours of the subtracted image. A gradient image is an image in which each pixel is assigned not the value of the signal detected at this place but the gradient, the derivative, of this value. The same operation is performed on all three external child triangles in a parent triangle. The external child triangles are those having an angle in common with parent triangle. The internal child triangle does not have any angle in common with the parent triangle. Clearly, no attention is paid to the central child triangle in the parent triangle.

If the average value of the gray levels in the gradient image of a child triangle is smaller than that of the parent triangle, then this child triangle is more homogeneous than its parent. This means that, proportionally, it is the site of fewer variations in gray levels. This means that the angles of the child triangle demarcate a structure more efficiently than do the angles of the parent triangle. The common vertex between these two parent and child triangles are then considered to be an active vertex.

The localization of the landmarks is thus optimized while, at the same time, the regular structure proper to the fast computation of interpolation is kept. Other solutions for measuring robustness can then be envisaged.

Four configurations are then possible. At the end of this first test, 0, 1, 2 or 3 vertices of a parent triangle are considered to be active. Should all three vertices be considered to be active, the parent triangle is sub-divided into four equilateral child triangles as explained here above, and the midpoints of the edges of the parent triangle are chosen as candidate landmarks, more densely distributed in this place.

One skilled in the art may make or propose various modifications to the structure/way and/or function and/or results and/or steps of the disclosed embodiments and equivalents thereof without departing from the scope and extant of the invention.

What is claimed is:

1. A method for the registration of images in digitized subtracted angiography comprising:
    irradiating a body by radiation;
    acquiring a first digitized mask image without an injection of a contrast agent into the body;
    injecting the contrast agent into the body;
    acquiring a second digitized contrast image;
    dividing the mask image with regular geometrical patterns;
    registering the mask image relative to the contrast image through the use of landmarks defined at the corners of the geometrical patterns;
    subtracting these two images after registration;
    displaying the subtracted image;
    testing the robustness of the landmarks; and
    if the robustness is insufficient, a subdivision is made of the regular geometrical patterns.

2. The method according to claim 1 wherein the regular geometrical patterns used during the division of the mask image is triangles.

3. The method according to claim 2 wherein the triangles are equilateral triangles.

4. The method according claim 1 wherein to decide whether or not to subdivide:
    subdividing a gradient image of the mask image;
    computing for each local pattern and for each subdivision of this local pattern in this gradient image of the mask image, the average of the gray levels; and
    creating intermediate landmarks at the intersections of these patterns and sub-patterns as a function of comparisons of these average values.

5. The method according claim 2 wherein to decide whether or not to subdivide:
    subdividing a gradient image of the mask image;
    computing for each local pattern and for each subdivision of this local pattern in this gradient image of the mask image, the average of the gray levels; and
    creating intermediate landmarks at the intersections of these patterns and sub-patterns as a function of comparisons of these average values.

6. The method according claim 3 wherein to decide whether or not to subdivide:
    subdividing a gradient image of the mask image;
    computing for each local pattern and for each subdivision of this local pattern in this gradient image of the mask image, the average of the gray levels; and
    creating intermediate landmarks at the intersections of these patterns and sub-patterns as a function of comparisons of these average values.

7. The method according to claim 1 wherein the registration of the mask image is a non-rigid registration, in which
    computing a shift vector for each landmark; and
    propagating these shift vectors to the rest of the pixels of the mask image by interpolation.

8. The method according to claim 2 wherein the registration of the mask image is a non-rigid registration, in which
    computing a shift vector for each landmark; and
    propagating these shift vectors to the rest of the pixels of the mask image by interpolation.

9. The method according to claim 3 wherein the registration of the mask image is a non-rigid registration comprising:
    computing a shift vector for each landmark; and
    propagating these shift vectors to the rest of the pixels of the mask image by interpolation.

10. The method according to claim 4 wherein the registration of the mask image is a non-rigid registration comprising:
    computing a shift vector for each landmark; and
    propagating these shift vectors to the rest of the pixels of the mask image by interpolation.

11. The method according to claim 7 comprising:
    selecting a region of interest for each landmark of the mask image to be registered; and
    computing the shift of the landmark by a process of similarity between the mask image and the contrast image.

12. The method according to claim 2 comprising:
    selecting a region of interest for each landmark of the mask image to be registered; and
    computing the shift of the landmark by a process of similarity between the mask image and the contrast image.

13. The method according to claim 3 comprising:
    selecting a region of interest for each landmark of the mask image to be registered; and
    computing the shift of the landmark by a process of similarity between the mask image and the contrast image.

14. The method according to claim 4 comprising:
    selecting a region of interest for each landmark of the mask image to be registered; and
    computing the shift of the landmark by a process of similarity between the mask image and the contrast image.

15. The method according to claim 7 wherein
to subdivide, two or three sub-patterns are grouped together and divided into two different triangles by means of a diagonal of these groups; and
the non-rigid registration of the mask image is performed by interpolation of the pixels in the different triangles.

16. The method according to claim 11 wherein
to subdivide, two or three sub-patterns are grouped together and divided into two different triangles by means of a diagonal of these groups; and
the non-rigid registration of the mask image is performed by interpolation of the pixels in the different triangles.

17. A computer program storage medium comprising a computer readable medium having program code means for implementing the steps of the method according to claim 1.

18. A computer program product comprising a computer readable medium having computer readable program code means embodied in the medium, the computer readable program code means implementing the steps of the method according to claim 1.

19. An article of manufacture for use with a computer system, the article of manufacture comprising a computer readable medium having computer readable program code means embodied in the medium, the program code means implementing the steps of the method according to claim 1.

20. A program storage device readable by a computer tangibly embodying a program of instructions executable by the computer to perform the steps of the method according to claim 1.

* * * * *